United States Patent [19]
Sluhan

[11] 3,750,847
[45] Aug. 7, 1973

[54] METHOD OF SUPPLYING AN AQUEOUS CUTTING FLUID TO MACHINE TOOLS
[75] Inventor: Clyde A. Sluhan, Perrysburg, Ohio
[73] Assignee: Master Chemical Corporation, Perrysburg, Ohio
[22] Filed: May 3, 1972
[21] Appl. No.: 249,930

[52] U.S. Cl.................. 184/1 E, 72/42, 83/170, 184/6.14
[51] Int. Cl............................................. F01m 9/02
[58] Field of Search................... 72/42; 83/170; 184/1 E, 6.14; 90/11 B, 11 C

[56] References Cited
UNITED STATES PATENTS
3,518,917  7/1970  Sluhan.............................. 184/1 E
FOREIGN PATENTS OR APPLICATIONS
341,242  1/1931  Great Britain.................... 184/6.14

*Primary Examiner*—Manuel A. Antonakas
*Attorney*—C. O. Marshall, Jr.

[57] ABSTRACT

An aqueous cutting or grinding fluid is fed to at least one machine tool having at least one cutting tool, and the used fluid is collected. Solids are removed from the used fluid to produce a supply of clarified fluid. A pH of 8 to 9.5 is maintained in the clarified fluid by addition of a base. Deionized water is supplied to the system to replace water losses, and a water-miscible lubricant is supplied to maintain a lubricant concentration in the system from 1 to 25 percent. Tramp oil is removed from the clarified fluid by passing a portion of the clarified fluid through a centrifuge, to maintain a tramp oil content of not more than 2 percent in the clarified fluid, and the resulting clarified fluid is reused.

1 Claim, 1 Drawing Figure

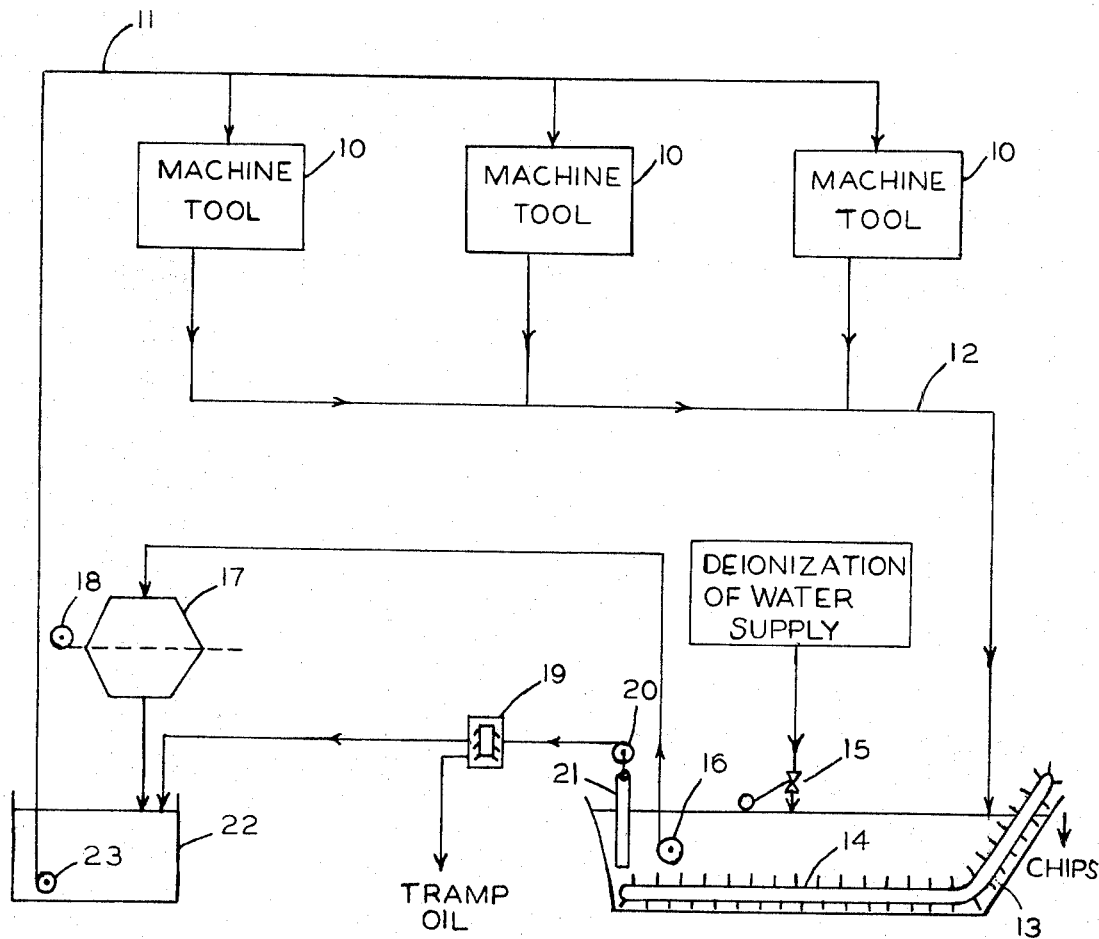

METHOD OF SUPPLYING AN AQUEOUS CUTTING FLUID TO MACHINE TOOLS

BACKGROUND OF THE INVENTION

Aqueous cutting and grinding fluids are used in large quantities for lubricating and cooling the cutting tools employed in machining operations such as drilling, boring, milling, turning and grinding. In a plant that contains a number of machine tools, a central system may be provided to supply the cutting or grinding fluid to all of the machines, and to collect the fluid from the machines so that it can be reused. The collected fluid, after removal of solids, is pumped back to the cutting tools which are to be lubricated and cooled.

The function of a cutting or grinding fluid is to lubricate the cutting tools, to act as a coolant, and to flush away chips and other debris in order to keep the work relatively clean. In order to perform these functions, a relatively large flow of cutting fluid must be supplied to each machine. Thus in a large plant the total amount of cutting fluid in the systems at any one time may be as many as several million gallons.

In the operation of central systems for supplying aqueous cutting fluids to machine tools, attempts have been made heretofore to keep the fluid clean in order to extend the life of the fluid as long as possible. In ordinary commercial practice, however, it has been found that the quality of an aqueous cutting fluid in a central system continues to deteriorate as the fluid is reused for machining operations, until the aqueous cutting fluid will no longer function properly, or until it has become so rancid from bacterial growth that it is intolerably obnoxious to the machine operators.

When the aqueous cutting fluid in a central system has become unusable, the entire contents of the system, which may consist of several million gallons, must be discarded, thus creating a serious waste disposal or stream pollution problem. The discarding of the aqueous cutting fluid in a central system also entails costly loss of production, because it requires that the entire system be shut down for a substantial period of time in order to permit the system to be emptied, cleaned and refilled with fresh aqueous cutting fluid. The cost of several million gallons of fresh aqueous cutting fluid is also substantial.

SUMMARY OF THE INVENTION

The principal object of the invention is to provide a method of operating a central system for supplying an aqueous cutting or grinding fluid to machine tools which prevents deterioration of the fluid and makes it possible to reuse the fluid indefinitely. By making it possible to reuse indefinitely the aqueous cutting or grinding fluid in a central system, the present method makes it unnecessary to discard the fluid periodically, and thus eliminates the problem of waste disposal and the problem of pollution of streams by discarded fluid.

The present invention is based upon the discovery that deterioration of the aqueous cutting or grinding fluid in a central system can be prevented by removing solids from the used fluid that is collected from the machine tools to produce a supply of clarified fluid, maintaining a pH of 8 to 9.5 in the clarified fluid by addition of a base, supplying deionized water to the system to replace water losses, removing tramp oil from the clarified fluid by passing a portion of the clarified fluid through a centrifuge, to maintain a tramp oil content of not more than 2 percent in the clarified fluid, and supplying a water-miscible lubricant to maintain a lubricant concentration in the system from 1 to 25 percent.

It has been found that by following the foregoing steps, the quality of an aqueous cutting or grinding fluid in a central system can be maintained so that the fluid can be reused indefinitely, and does not need to be discarded periodically.

BRIEF DESCRIPTION OF THE DRAWING

The drawing is a flow diagram illustrating the method of the present invention.

DESCRIPTION OF THE PREFERRED EMBODIMENTS

It is customary in machining operations to employ a copious flow of an aqueous cutting fluid to lubricate and cool the cutting tools, and to flush away chips and other debris. As the used cutting fluid flows from the machines, it runs into trenches through which it flows rapidly to a central settling tank where the suspended chips and particles are allowed to settle out. Usually the cutting fluid is pumped from the settling tank through a filter in order to complete tha clarification of the fluid. In a typical system in which the total amount of aqueous cutting fluid in the system is 90,000 gallons, the fluid may be supplied to the machine tools in a flow rate as high as 13,000 gallons per minuts.

Chemical Treatment of the Aqueous Cutting Fluid

In the practice of the present method, the pH of the aqueous cutting or grinding fluid in the central system is maintained in the range from 8 to 9.5, by periodic addition of a base such as potassium hydroxide, sodium hydroxide, triethanolamine, diethanolamine or monoethanolamine. It has been found that by maintaining the aqueous cutting or grinding fluid at a pH of at least 8, the growth of bacteria is controlled. A pH of about 8.5 is preferred when the machines are manually operated, to prevent the fluid from becoming rancid, but a pH of 9 to 9.5 can be used advantageously when the operation of the machines is automatic and the fluid does not come into contact with the hands of operators. A pH above 9.5 is not ordinarily satisfactory, because it causes the fluid to absorb carbon dioxide from the atmosphere, resulting in deposits of carbonates such as sodium carbonate upon the machines.

In order to permit the aqueous cutting or grinding fluid in a central system to be reused indefinitely, a suitable concentration of a rust inhibitor should be maintained in the fluid. For example, a nitrite concentration between 0.001 and 0.1 percent may be maintained by periodic addition of an alkali metal nitrite. Since a nitrite in the fluid is substantially hydrolyzed, the nitrite concentration is expressed as per cent by weight of nitrite ions in the fluid. The nitrite ion concentration of the fluid in the central system may be determined periodically by standard tests. When the concentration is found to be as low as 0.001 percent, sodium nitrite or another nitrite may be added in an amount sufficient to bring the nitrite ion concentration to a value as high as 0.1 percent. Maintaining the nitrite ion concentration in this range prevents the fluid from causing corrosion of the machines.

Replacement of Water Losses

In the operation of a central system for supplying an aqueous cutting or grinding fluid to machine tools, water is constantly lost from the system by evaporation, and the water lost by evaporation must be replaced in order to maintain the desired total volume of fluid in the system.

In the practice of the present invention, it has been found to be essential to use deionized water to replace water losses, in order to make it possible to use an aqueous cutting or grinding fluid indefinitely. The use of hard water would introduce corrosive salts, the concentration of which would build up as water is lost by evaporation.

One effect of deionizing the water supply is to remove calcium and magnesium ions which, if not removed from the water supply, would react with the surfactant in the fluid to form insoluble calcium and magnesium salts. Another important effect of deionizing the water supplied to the system is the removal of iron salts. If not removed by deionization, iron salts which are present in the water supply will form gelatinous precipitates of iron hydroxides which will make it very difficult to remove solid particles from the used fluid.

In the practice of the present method, deionization of the water supply may be carried out by means of conventional deionization apparatus, in which the water supply is first passed through a bed of ion exchange resin to remove cations from the water supply, and is then passed through another bed of ion exchange resin to remove anions from the water supply.

The ion exchange resin used for anion removal preferably is strongly basic, so as to be capable of removing carbon dioxide as well as silicic acid from the water supply. Carbon dioxide, if not removed, tends to cause corrosion, and silicic acid may form a gelatinous precipitate which interferes with solids separation. Deionization reduces the dissolved material in the water supply to about 0.5 parts per million.

Removing Tramp Oil from the Clarified Fluid By Passing a Portion of the Clarified Fluid Through a Centrifuge Another essential step in the present method is that of removing tramp oil from the clarified fluid by passing a portion of the clarified fluid through a centrifuge, to maintain a tramp oil content of not more than 2 percent in the clarified fluid.

The tramp oil which is found in an aqueous cutting or grinding fluid consists of mineral oil which is used to lubricate the moving parts of machine tools and which leaks from the machine tools and is carried off with the used fluid. As the fluid in a central system is used over and over, the content of tramp oil in the central system tends to increase. It has been found that if the tramp oil content of an aqueous cutting or grinding fluid is more than about 2 percent, the tramp oil tends to form a film on the cutting tools and thus interferes with the cooling action of the fluid. Such a high content of tramp oil in the fluid also causes particles to stick to the tools. Some of the tramp oil also is vaporized during a machining operation, producing an objectionable mist or smoke.

In the practice of the present method, a portion of the clarified fluid in the central system is passed through a centrifuge, to maintain a tramp oil content of not more than 2 percent in the clarified fluid. The centrifuge employed may be a conventional centrifuge, provided with an inlet for the liquid to be separated, and provided with a heavy phase outlet through which the clean fluid is discharged and a light phase outlet through which the tramp oil is discharged to a suitable receiver. Preferably the centrifuge is of the self-cleaning type, which automatically ejects solids at regular intervals through a sludge outlet while the centrifuge is in operation.

In the practice of the present invention, the volume of fluid passing through the centrifuge each hour preferably is at least 1 percent of the total volume of fluid in the system. In this way, a centrifuge having a capacity of 1,000 to 3,000 gallons per hour will remove from 200 to 2,000 gallons per day of tramp oil, depending on the amount of tramp oil present, so as to maintain the tramp oil content in the system at not more than 1 to 1.5 percent.

Maintaining a tramp oil content of not more than 2 percent in the clarified fluid in the practice of the invention is essential not only to provide satisfactory results in the operation of machine tools, but also to facilitate the removal of solids from the used fluid and to control the growth of bacteria in the system.

Water-Miscible Lubricant

Another essential step in the present method is that of supplying a water-miscible lubricant to the central system in order to maintain a lubricant concentration in the system from 1 to 25 percent. The term "water-miscible lubricant" is used herein to describe a lubricant which forms a stable solution or stable suspension that functions as an aqueous cutting or grinding fluid.

In the practice of the present invention, losses of the fluid occur as chips are removed. Thus it is necessary not only to supply deionized water to the system, but also to supply a water-miscible lubricant to maintain the desired lubricant concentration in the system.

Any desired water-miscible lubricant may be used in the practice of the present method. The water-miscible lubricant, which imparts lubricating properties to the aqueous cutting fluid, may be anionic, cationic or non-ionic.

One type of lubricant which may be used in the practice of the present method is a water-soluble salt of boric acid with an aliphatic amine having from 1 to 3 aliphatic radicals each of which contains from 1 to 4 carbon atoms and has at least 1 hydroxy group attached to a carbon atom. Examples of such water-soluble salts are triethanolamine borate and diethanolamine borate. The concentration of such a lubricant in the fluid may be from 1 to 3 percent.

Another type of lubricant which may be used in the practice of the present method is a water-emulsifiable composition consisting essentially of a mineral oil together with an emulsifying agent capable of causing the mineral oil to form a stable emulsion with water. The mineral oil used may be any suitable petroleum fraction, but preferably is a naphthenic oil. Preferably the emulsifying agent used in combination with a mineral oil is a combination of anionic and non-ionic surfactants. Anionic surfactants which may be used include sodium petroleum sulfonates and sodium or potassium oleates. Non-ionic surfactants which may be employed are condensation products of ethylene oxide with derivatives of fatty acids such as alcohols, alcohols, or amines. The concentration of each of these emulsifying agents in the mineral oil may be from 2 to 15 percent, but usually is not more than 10 percent. Another anionic surfactant which may be used is an amine phosphate.

A typical water-emulsifiable lubricant used in the practice of the invention contains from 50 to 80 parts by weight of a mineral oil and from 5 to 20 parts by weight of a sodium petroleum sulfonate. For extreme pressure cutting operations, the lubricant may also contain up to 20 parts of a chlorinated paraffin or a sulfurized olefin. The concentration of such a lubricant in the fluid may be from 5 to 10 percent. The petroleum sulfonate in such a lubricant also functions as a rust inhibitor.

For heavy duty applications, the fluid used in the practice of the present invention may contain a salt of an unsaturated fatty acid having from 18 to 22 carbon atoms, such as oleic acid or linoleic acid, with a water-soluble amine such as triethanolamine, diethanolamine or ethanolamine, in an amount equal to 3 to 30 percent of the solids content of the fluid.

In the practice of the present method it is also advantageous to add periodically to the central system a germicide such as a sodium salt of mercaptobenzothiazole or a sodium salt of dithiocarbamic acid.

OPERATION

In the practice of the present method, an aqueous cutting or grinding fluid is supplied from a main 11 to at least one machine tool 10 having at least one cutting tool.

The used aqueous cutting fluid flowing from the machine tools 10 is collected in a suitable return trough 12, which leads to a drag-out tank 13.

In the drag-out tank 13, solids are removed from the used aqueous cutting fluid. An endless conveyer 14 is provided with suitable flights such as chains, by means of which the chips and other debris which settle to the bottom of the drag-out tank are gradually removed from the drag-out tank and discharged into a suitable receptacle. The chips and other metallic fragments thus collected may be remelted.

The level of the liquid in the drag-out tank 13 is maintained at a substantially constant level by means of a float valve 15 through which is admitted water which has been deionized as hereinbefore described.

The liquid from which most of the solids have been removed in the drag-out tank 13 is conveyed by means of a pump 16 to a filter 17, or other solids-separating device such as a cyclonic or low velocity separator. Although a filter 17 is ordinarily necessary, the filter may be omitted in cases in which the solids removal action in the drag-out tank is very efficient.

The filter 17 may be of a conventional type, in which the filter medium is a continuous web of filter paper which is intermittently wound up by means of a driving motor 18. In the operation of such a filter, it is customary to provide a pressure control which is automatically actuated to cause the drive motor 18 to wind up a section of the filter paper whenever the pressure drop across the filter paper exceeds a predetermined value.

A centrifuge 19 of the type hereinbefore described is continuously fed with liquid from the drag-out tank 13 by means of a pump 20. The intake line 21 leading to the pump 20 preferably is of a sufficient diameter to provide a vertical, streamline flow of 3 to 6 feet per minute so as to provide minimum entrainment of particles.

Alternatively, the centrifuge may be provided with an intake strainer which removes particles that will not pass a 100 mesh screen.

The clarified fluid from the centrifuge 19 flows to a reservoir 22, and the tramp oil from the centrifuge is discharged into a suitable receptacle.

In the practice of the present method, a suitable concentration of a rust inhibitor, as hereinbefore described, is maintained in the reservoir 22. The concentration of the rust inhibitor in the reservoir 22 is determined periodically by means of standard tests, and when the concentration has decreased to the minimum permissible value more rust inhibitor is added.

In the practice of the present invention, it is essential also to maintain a pH of 8 to 9.5 in the reservoir 22. For that purpose, the pH of the clarified fluid in the reservoir 22 may be determined continuously or from time to time by means of an electrometric pH meter. From time to time, a base is added as hereinbefore described to maintain a pH of 8 to 9.5 in the reservoir 22.

Finally, in the practice of the present method the concentration of the lubricant in the reservoir 22 is determined continuously or intermittently by means of a refractometer or titration device, and a water-miscible lubricant is added from time to time as hereinbefore described to maintain the desired concentration of the fluid. The concentration used in the practice of the invention may be from 1 to 25 percent, but the usual concentration in the fluid is between 2 and 10 percent.

The centrifuge 19 preferably is operated continuously, and has a capacity such that tramp oil content in the reservoir 22 is maintained at about 1 percent, and not higher than about 2 percent.

The clarified fluid is returned by means of a pump 23 to the main 11 which supplies it to the machine tools 10 for reuse.

I claim:

1. A method of supplying an aqueous cutting fluid to machine tools, comprising the steps of (a) feeding an aqueous cutting or grinding fluid to at least one machine tool having at least one cutting tool, (b) collecting the used fluid, (c) removing solids from the used fluid to produce a supply of clarified fluid, (d) maintaining a pH of 8 to 9.5 in the clarified fluid by addition of a base, (e) supplying deionized water to the system to replace water losses, (f) supplying a water-miscible lubricant to maintain a lubricant concentration in the system from 1 to 25 percent, (g) removing tramp oil from the clarified fluid by passing a portion of the clarified fluid through a centrifuge, to maintain a tramp oil content of not more than 2 percent in the clarified fluid, and (h) reusing the clarified aqueous fluid.

* * * * *